United States Patent
Wakimoto (10) Patent No.: US 12,074,345 B2
(45) Date of Patent: Aug. 27, 2024

(54) TERMINAL, SECONDARY BATTERY PROVIDED WITH SAME, AND METHODS FOR PRODUCING SAME

(71) Applicant: PRIME PLANET ENERGY & SOLUTIONS, INC., Tokyo (JP)

(72) Inventor: Ryoichi Wakimoto, Kobe (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 67 days.

(21) Appl. No.: 17/411,430

(22) Filed: Aug. 25, 2021

(65) Prior Publication Data

US 2022/0085464 A1    Mar. 17, 2022

(30) Foreign Application Priority Data

Sep. 17, 2020    (JP) .................................. 2020-155916

(51) Int. Cl.
*H01M 50/557*    (2021.01)
*H01G 11/76*    (2013.01)
(Continued)

(52) U.S. Cl.
CPC ....... *H01M 50/557* (2021.01); *H01M 50/528* (2021.01); *H01M 50/553* (2021.01);
(Continued)

(58) Field of Classification Search
CPC ............. H01M 50/557; H01M 50/528; H01M 50/553; H01M 50/566; H01M 50/567; H01M 50/55; H01M 50/564; H01M 50/103; H01M 50/176; H01M 10/04; H01M 10/0525

See application file for complete search history.

(56) References Cited

U.S. PATENT DOCUMENTS 4,358,518 A    11/1982    Matter
2012/0058388 A1    3/2012    Kim et al.
(Continued)

FOREIGN PATENT DOCUMENTS

CN    102544423 A    7/2012
CN    104904036 A    9/2015
(Continued)

OTHER PUBLICATIONS

English Translation of JP 2017117574A Power Storage Device; GS Yuasa Corp; Honda motor Co Ltd; Jun. 29, 2017 (Year: 2017).*
(Continued)

*Primary Examiner* — Matthew T Martin
*Assistant Examiner* — Adam J Francis
(74) *Attorney, Agent, or Firm* — Finnegan, Henderson, Farabow, Garrett and Dunner, LLP (57) ABSTRACT

Provided is a terminal of improved conduction reliability. The terminal disclosed herein has a plate-shaped first conductive member; a second conductive member electrically connected to the first conductive member; a fastening portion at which there are mechanically fixed the first conductive member and a flange portion of the second conductive member; and a metal joint in which the first conductive member and the flange portion of the second conductive member are metal-joined, at a position spaced from the fastening portion.

20 Claims, 6 Drawing Sheets

(51) Int. Cl.
   *H01G 11/84*     (2013.01)
   *H01M 50/528*    (2021.01)
   *H01M 50/55*     (2021.01)
   *H01M 50/553*    (2021.01)
   *H01M 50/566*    (2021.01)
   *H01M 50/567*    (2021.01)

(52) U.S. Cl.
   CPC ....... *H01M 50/566* (2021.01); *H01M 50/567* (2021.01); *H01G 11/76* (2013.01); *H01G 11/84* (2013.01); *H01M 50/55* (2021.01)

(56) References Cited

U.S. PATENT DOCUMENTS

| | | | |
|---|---|---|---|
| 2012/0148908 A1* | 6/2012 | Ito | H01M 50/553 29/874 |
| 2012/0177978 A1 | 7/2012 | Kim et al. | |
| 2012/0225348 A1* | 9/2012 | Kim | H01M 50/562 429/179 |
| 2014/0065897 A1* | 3/2014 | Kida | H01R 13/02 439/889 |
| 2015/0318519 A1 | 11/2015 | Tsutsumi et al. | |
| 2016/0043353 A1 | 2/2016 | Tsutsumi et al. | |
| 2016/0118641 A1 | 4/2016 | Oda et al. | |
| 2017/0229700 A1* | 8/2017 | Matsumoto | H01M 50/50 |
| 2020/0108527 A1 | 4/2020 | Yamamoto et al. | |
| 2020/0212415 A1 | 7/2020 | Muroya et al. | |

FOREIGN PATENT DOCUMENTS

| | | |
|---|---|---|
| CN | 106575741 A | 4/2017 |
| CN | 111384355 A | 7/2020 |
| EP | 2 463 937 B1 | 11/2018 |
| JP | 2005-285406 A | 10/2005 |
| JP | 2012-138342 A | 7/2012 |
| JP | 2012-146664 A | 8/2012 |
| JP | 2013-075297 A | 4/2013 |
| JP | 2013075297 A * | 4/2013 |
| JP | 2013-222621 A | 10/2013 |
| JP | 2014-011081 A | 1/2014 |
| JP | 2014-222620 A | 11/2014 |
| JP | 2014-235870 A | 12/2014 |
| JP | 2015-011849 A | 1/2015 |
| JP | 2016-085961 A | 5/2016 |
| JP | 2016-192322 A | 11/2016 |
| JP | 2016-207510 A | 12/2016 |
| JP | 2016225106 A * | 12/2016 |
| JP | 2017117574 A * | 6/2017 .......... H01M 2/1077 |
| JP | 6216368 B2 | 10/2017 |
| JP | 2018-001209 A | 1/2018 |
| JP | 2020-99940 A | 7/2020 |
| JP | 2020-107464 A | 7/2020 |
| WO | WO 2014/103874 A1 | 7/2014 |
| WO | WO 2016/020996 A1 | 2/2016 |

OTHER PUBLICATIONS

English Translation of JP 2016225106A—Connector terminal and bus bar employing the connector terminal; Takasho Giken KK; Suzuki Takafumi Dec. 28, 2016 (Year: 2016).*

Office Action dated Jun. 9, 2023, issued in U.S. Appl. No. 17/469,801.

Final Office Action in U.S. Appl. No. 17/469,801, dated Dec. 18, 2023.

Advisory Action Before the Filing of an Appeal Brief in U.S. Appl. No. 17/469,801, dated Mar. 1, 2024.

* cited by examiner

TERMINAL, SECONDARY BATTERY PROVIDED WITH SAME, AND METHODS FOR PRODUCING SAME

CROSS REFERENCE TO RELATED APPLICATIONS

The present application claims priority to Japanese Patent Application No. 2020-155916 filed on Sep. 17, 2020, the entire contents whereof are incorporated in the present specification by reference.

BACKGROUND

The present disclosure relates to a terminal, to a secondary battery provided with the terminal, and to methods for producing the foregoing.

Generally, batteries such as lithium ion secondary batteries are provided with an electrode body having electrodes, and a battery case that accommodates the electrode body. Terminals are known, in this kind of batteries, that are electrically connected to electrodes in the interior of battery cases and are led out of the battery case. For example Japanese Patent No. 6216368, as an instance of conventional art relating to such terminals, discloses a terminal structure provided with: a rivet member, electrically connected to an electrode in the interior of a battery case, and that is inserted into a through-hole of the battery case and protrudes to the exterior; and a lead-out member having a first through-hole into which the rivet member is inserted and that electrically connects the rivet member and a terminal bolt for external connection. Further, Japanese Patent No. 6216368 describes a feature wherein the rivet member is inserted into the first through-hole of the lead-out member, and the tip is crimped in the vertical direction, so that as a result the rivet member becomes crimped onto a peripheral edge portion of the lead-out member surrounding the first through-hole, and the rivet member and the lead-out member become electrically connected.

SUMMARY

However, studies by the inventors have revealed that the above technique has room for improvement. Specifically, the battery may be acted upon, when in use, by external forces such as vibration and shocks. As a result, the portion fixed by crimping may wobble, strain may develop, and a gap may arise between the rivet member and the lead-out member. Electrical conduction in the terminals may in consequence become unstable, resulting in defective conduction. There is accordingly a need for improving conduction reliability in terminals.

It is an object of the present disclosure, arrived at in the light of the above considerations, to provide a terminal of improved conduction reliability, a battery having the terminal, and methods for producing the foregoing.

The present disclosure provides a terminal having: a plate-shaped first conductive member; a second conductive member having a flange portion electrically connected to the first conductive member; a fastening portion at which there are mechanically fixed the first conductive member and the flange portion of the second conductive member; and a metal joint at which the first conductive member and the flange portion of the second conductive member are metal-joined, at a position spaced from the fastening portion.

The terminal is thus provided with two types of linking portions involving different connecting methods, i.e. the fastening portion and the metal joint. As a result, strain does not readily build in the terminal, and a state of close contact between the first conductive member and the second conductive member can be readily maintained, even when the terminal is acted upon by external vibration or shocks. It becomes therefore possible to stably maintain a conductive connection between the first conductive member and the second conductive member, and to improve conduction reliability.

In a preferred implementation of the terminal disclosed herein, the first conductive member has a recess that accommodates at least part of the flange portion of the second conductive member; and the fastening portion is configured through fixing of an inner wall of the recess of the first conductive member by the portion of the second conductive member accommodated in the recess. This allows increasing the strength of the fastening portion.

In a preferred implementation of the terminal disclosed herein, the flange portion of the second conductive member has a constriction portion fitting with the first conductive member; and the fastening portion is a fitting portion at which the constriction portion of the second conductive member and the first conductive member are fitted with each other. Thanks to the constriction portion of the second conductive member, for instance the two conductive members can be suitably fixed even made up of dissimilar metals. Workability at the time of formation of the fastening portion can also be improved.

In a preferred implementation of the terminal disclosed herein, the flange portion of the second conductive member has a through-hole; the first conductive member has a leg portion inserted into the through-hole; and the fastening portion is configured through insertion of that the leg portion of the first conductive member into the through-hole of the second conductive member. This allows increasing the strength of the fastening portion. This allows increasing workability at the time of formation of the fastening portion.

In a preferred implementation of the terminal disclosed herein, the fastening portion is a crimp portion in which a tip of the leg portion is crimped onto a peripheral edge portion of the through-hole. Workability at the time of formation of the fastening portion can be increased as a result.

In a preferred implementation of the terminal disclosed herein, the metal joint is a welded joint. A high-strength metal joint can thus be formed stably by welding.

In a preferred implementation of the terminal disclosed herein, the metal joint is provided closer to the center or the flange portion than the fastening portion, in a plan view. Research by the inventors has revealed that the metal joint exhibits relatively lower strength (more brittleness) than the fastening portion. By arranging such a metal joint thus on the center side it becomes possible to stably maintain the metal joint, and to increase the conduction reliability of the terminal over long periods of time.

In a preferred implementation of the terminal disclosed herein, the first conductive member has a substantially rectangular shape, and the position of the center of the first conductive member and the position of the center of the flange portion of the second conductive member are offset from each other, in a long side direction of the first conductive member. In a case where multiple batteries are electrically connected to each other by way of bus bars, this allows the bus bars to be readily attached as a result to the first conductive member, so that the conduction reliability of the resulting assembled battery can be improved.

In a preferred implementation of the terminal disclosed herein, the fastening portion is provided on one face of the first conductive member; and the metal joint is provided on the other face of the first conductive member. The conduction reliability of the terminal can be further improved as a result.

The present disclosure provides also a secondary battery having the above terminal. The reliability of the secondary battery can be improved as a result.

Further, the present disclosure provides a method for producing a terminal, the method having: a fastening step of mechanically fixing a plate-shaped first conductive member and a flange portion of a second conductive member, to form a fastening portion that electrically connects the first conductive member and the second conductive member; and a metal joining step of, after the fastening step, forming a metal joint through metal-joining of the first conductive member and the flange portion of the second conductive member, at a position spaced from the fastening portion.

In the production method two conductive members are connected to each other by two types of linking portions involving dissimilar connecting methods, i.e. the fastening portion and the metal joint. As a result, strain does not readily build in the terminal, and a state of close contact between the first conductive member and the second conductive member can be readily maintained, even when the terminal is acted upon by external vibration or shocks. Moreover, a metal joint of stable shape can be formed, with good precision, by forming the metal joint after the fastening step. It becomes accordingly possible to stably maintain a conductive connection between the first conductive member and the second conductive member. Therefore, a terminal of improved conduction reliability can be produced suitably.

In a preferred implementation of the production method disclosed herein, the first conductive member has a recess that accommodates at least part of the flange portion of the second conductive member; and in the fastening step, part of the second conductive member is inserted into the recess, and the recess of the first conductive member is deformed along an external shape of the second conductive member, to fix as a result an inner wall of the recess by the second conductive member, and thereby form the fastening portion. This allows increasing the strength of the fastening portion.

In a preferred implementation of the production method disclosed herein, the flange portion of the second conductive member has a constriction portion fitting with the first conductive member; and in the fastening step, the fastening portion is formed through fitting of the first conductive member to the constriction portion of the second conductive member. Thanks to the constriction portion of the second conductive member, for instance the two conductive members can be suitably fixed even made up of dissimilar metals. This allows increasing workability at the time of formation of the fastening portion.

In a preferred implementation of the production method disclosed herein, in the metal joining step a welded joint is formed through welding of the first conductive member and the flange portion of the second conductive member. A high-strength metal joint can thus be formed stably by welding.

In a preferred implementation of the production method disclosed herein, the metal joint is provided closer to the center or the flange portion than the fastening portion, in a plan view. As a result joint points are less likely to shift at the time of joining, and workability in the metal joining step can be improved. Further, welds are not prone to wobble in a case where the metal joint is formed through welding, and weldability can be improved.

The present disclosure further provides a method for producing a secondary battery, in which there is used a terminal produced in accordance with the above method for producing a terminal. This allows suitably producing a secondary battery exhibiting increased terminal conduction reliability.

DETAILED DESCRIPTION

Preferred embodiments of the art disclosed herein will be explained next with reference to accompanying drawings. Any features other than the matter specifically set forth in the present specification and that may be necessary for carrying out the present disclosure (for instance, the general configuration and production process of a battery, and not being characterizing features of the present disclosure) can be regarded as instances of design matter, for a person skilled in the art, based on known techniques in the relevant technical field. The disclosure can be realized on the basis of the disclosure of the present specification and common technical knowledge in the technical field in question.

In the present specification the term "battery" denotes power storage devices in general, capable of extracting electric energy, and encompasses conceptually primary batteries and secondary batteries. In the present specification the term "secondary battery" denotes power storage devices in general, capable of being charged and discharged repeatedly, and includes so-called storage batteries (chemical batteries) such as lithium ion secondary batteries and nickel hydride batteries, as well as capacitors (physical batteries) such as electrical double layer capacitors.

Battery 100

Figure 1:
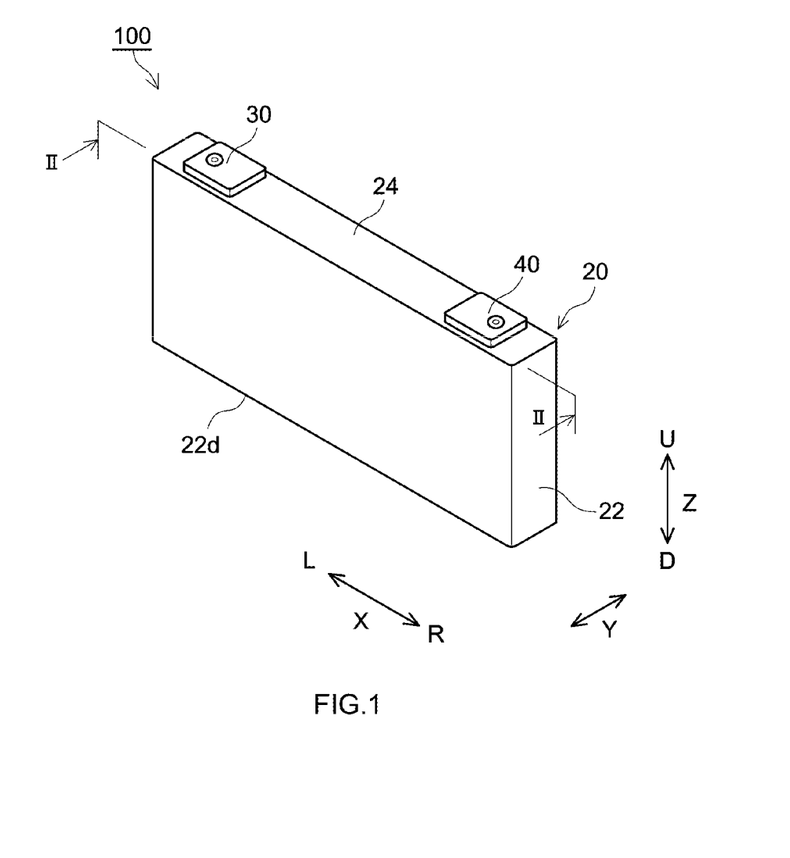
FIG. 1 is a perspective-view diagram illustrating schematically a battery according to an embodiment.
Figure 2:
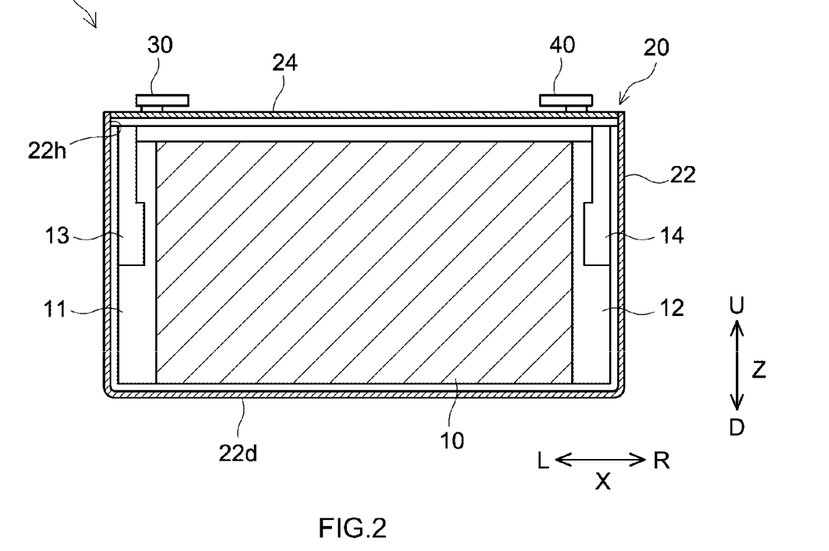
FIG. 2 is a schematic longitudinal cross-sectional diagram along line II-II in FIG. 1.

FIG. 1 is a perspective-view diagram of a battery 100. FIG. 2 is a schematic longitudinal cross-sectional diagram along line II-II in FIG. 1. In the explanation below the reference symbols L, R, U, and D in the drawings represent left, right, up, and down, and the symbols X, Y and Z in the drawings represent respectively a long side direction of the battery 100, and a short side direction and a vertical direction perpendicular to the long side direction. However, the foregoing are merely directions for convenience of explanation, and do not limit in any way the manner in which the battery 100 is installed.

As illustrated in FIG. 2, the battery 100 is provided with an electrode body 10, a battery case 20, a positive electrode terminal 30 and a negative electrode terminal 40. The battery 100 is characterized by being provided with the positive electrode terminal 30 and/or negative electrode terminal 40 disclosed herein; other features of the battery 100 may be similar to conventional ones. The battery 100 is herein a lithium ion secondary battery. Although omitted in the figures, the battery 100 further has for instance an electrolyte. The battery 100 has a configuration in which the electrode body 10 and the electrolyte, not shown, are accommodated in the battery case 20.

The electrode body 10 may be identical to a conventional one, and is not particularly limited. The electrode body 10 has a positive electrode and a negative electrode (not shown). The electrode body 10 is for instance a flat wound electrode body obtained by winding, about a winding axis, a stack in which a band-like positive electrode and a band-like negative electrode are laid up while insulated from each other by an interposed band-like separator. The electrode body 10 may be a multilayer electrode body obtained through superposition of a square (typically rectangular) positive electrode and a square (typically rectangular) negative electrode while insulated from each other. The positive electrode has a positive electrode collector 11 and a positive electrode mix layer (not shown) adhered to the positive electrode collector 11. The positive electrode collector 11 is for instance made up of a metal such as aluminum or an aluminum alloy, nickel or stainless steel. The positive electrode mix layer contains for instance a positive electrode active material (for instance a lithium-transition metal complex oxide). The negative electrode has a negative electrode collector 12 and a negative electrode mix layer (not shown) adhered to the negative electrode collector 12. The negative electrode collector is for instance made up of a metal such as copper, a copper alloy, nickel or stainless steel. The negative electrode mix layer contains a negative electrode active material (for instance a carbonaceous material such as graphite).

As illustrated in FIG. 2, in the central portion of the electrode body 10 in the long side direction X a multilayer portion is formed that results from stacking of the positive electrode mix layer and the negative electrode mix layer while insulated from each other. Meanwhile, part of the positive electrode collector 11 (positive electrode collector exposed portion) at which the positive electrode mix layer is not formed protrudes, beyond the multilayer portion, at the left end section of the electrode body 10 in the long side direction X. A positive electrode lead member 13 is attached to the positive electrode collector exposed portion. The positive electrode lead member 13 may be made up of the same metallic material as that of the positive electrode collector 11, for instance a conductive metal such as aluminum, an aluminum alloy, nickel or stainless steel. Part of the negative electrode collector 12 (negative electrode collector exposed portion) at which the negative electrode mix layer is not formed protrudes, beyond the multilayer portion, at the right end section of the electrode body 10 in the long side direction X. A negative electrode lead member 14 is attached to the negative electrode collector exposed portion. The material (metal species) of the negative electrode lead member 14 may be different from that of the positive electrode lead member 13. The negative electrode lead member 14 may be made up of the same metallic material as that of the negative electrode collector 12, for instance a conductive metal such as copper, a copper alloy, nickel or stainless steel.

The electrolyte may be identical to a conventional one, and is not particularly limited. The electrolyte is for instance a nonaqueous liquid electrolyte (nonaqueous electrolyte solution) that contains a nonaqueous solvent and a supporting salt. The nonaqueous solvent includes for instance a carbonate such as ethylene carbonate, dimethyl carbonate, ethyl methyl carbonate or the like. The supporting salt is for instance a fluorine-containing lithium salt such as $LiPF_6$. The electrolyte may be a solid (solid electrolyte), and may be integrated with the electrode body 10.

The battery case 20 is a housing that accommodates the electrode body 10. The battery case 20 is herein formed to a flat bottomed cuboid shape (square shape). However, the shape of the battery case 20 is not limited to a square shape, and may be an arbitrary shape such as a cylindrical shape. The material of the battery case 20 may be identical to conventionally used materials, and is not particularly limited. The battery case 20 is for instance made up of a lightweight metallic material of good thermal conductivity, such as aluminum, an aluminum alloy or stainless steel. As illustrated in FIG. 2, the battery case 20 is provided with a case body 22 having an opening 22h, and a lid body (sealing plate) 24 that plugs the opening 22h. The battery case 20 becomes integrated through joining of the lid body 24 (for instance by welding) to the peripheral edge of the opening 22h of the case body 22. The battery case 20 is sealed in an air-tight manner.

The case body 22 has a flat plate-shaped bottom surface 22d. The lid body 24 opposes the bottom surface 22d of the case body 22. The lid body 24 is attached to the case body 22 so as to plug the opening 22h of the case body 22. The lid body 24 has herein a substantially rectangular shape. In the present specification the term "substantially rectangular shape" encompasses, in addition to perfect rectangular shapes (oblong shapes), also shapes with rounding of the corners of a rectangular shape that connects the long sides and short sides, and also shapes having cutouts at corners.

As illustrated in FIG. 1, the positive electrode terminal 30 and the negative electrode terminal 40 protrude out of the battery case 20. The positive electrode terminal 30 and the negative electrode terminal 40 protrude from the same surface (specifically from the lid body 24) of the battery case 20. The positive electrode terminal 30 and the negative electrode terminal 40 may however protrude from mutually different faces of the battery case 20. The positive electrode terminal 30 and the negative electrode terminal 40 are disposed at either respective end of the lid body 24 in the long side direction X. The positive electrode terminal 30 and/or negative electrode terminal 40 are an example of the terminal disclosed herein.

The positive electrode terminal 30 is electrically connected to the positive electrode of the electrode body 10 via the positive electrode lead member 13, in the interior of the battery case 20. The negative electrode terminal 40 is electrically connected to the negative electrode of the electrode body 10 via the negative electrode lead member 14, in the interior of the battery case 20. The positive electrode terminal 30 and the negative electrode terminal 40 are attached to the lid body 24. The positive electrode terminal 30 and the negative electrode terminal 40 are insulated from the lid body 24 by way of a gasket 50 (see FIG. 3) and an insulator 60 (see FIG. 3) interposed in between.

Figure 3:
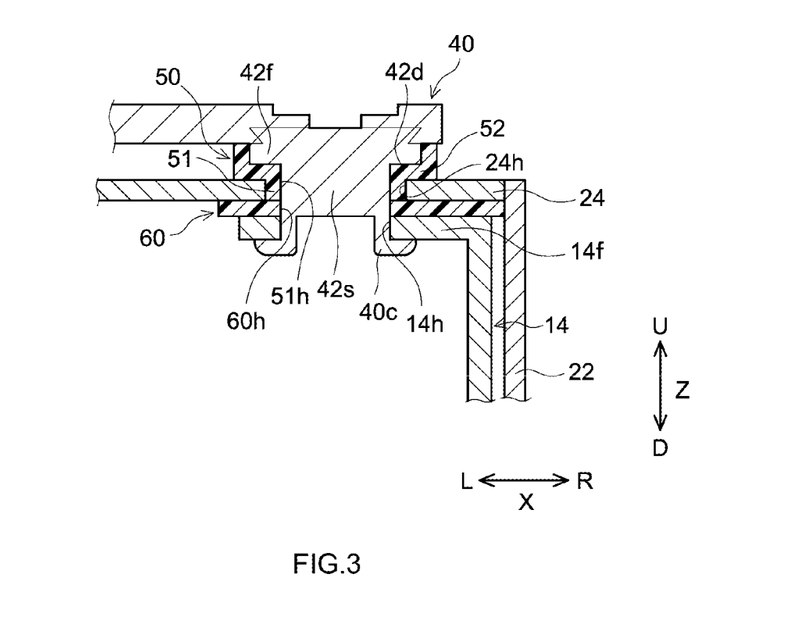
FIG. 3 is a partial enlarged cross-sectional diagram illustrating schematically the vicinity of a negative electrode terminal.

FIG. 3 is a partial enlarged cross-sectional diagram illustrating schematically the vicinity of the negative electrode terminal 40. The terminal structure on the side of the negative electrode terminal 40 will be explained in detail below, as an example, but the same applies to the terminal structure on the side of the positive electrode terminal 30. Such being the case, instances of the language "negative electrode" in the disclosure that follows can be appropriately read as "positive electrode".

As illustrated in FIG. 3, a terminal lead-out hole 24h running through in a vertical direction Z is formed in the lid body 24. The terminal lead-out hole 24h has for instance a ring-like (for instance annular shape) in a plan view. The terminal lead-out hole 24h has an inner diameter of a size that allows inserting a pillar portion 42s prior to a below-described crimping process of the negative electrode terminal 40. The terminal lead-out hole 24h is formed to be smaller than a below-described flange portion 42f of the negative electrode terminal 40.

The negative electrode lead member 14 is attached to the negative electrode collector exposed portion of the negative electrode collector 12, to configure a conduction path that electrically connects the negative electrode and the negative electrode terminal 40. The negative electrode lead member 14 has a flat plate-shaped portion 14f spreading horizontally along the inward surface of the lid body 24. A through-hole 14h is formed in the flat plate-shaped portion 14f, at a position corresponding to the terminal lead-out hole 24h. The through-hole 14h has an inner diameter of a size that allows inserting the pillar portion 42s prior to a below-described crimping process of the negative electrode terminal 40. The negative electrode lead member 14 is fixed to the lid body 24, through a crimping process, in a state of being insulated by the insulator 60.

The gasket 50 is an insulating member disposed between the top face (outward face) of the lid body 24 and the negative electrode terminal 40. The gasket 50 has the function of insulating the lid body 24 and the negative electrode terminal 40, and of closing off the terminal lead-out hole 24h. The gasket 50 is made up of a resin material having electrical insulating properties and being capable of deforming elastically, for instance a fluororesin such as a perfluoroalkoxy fluororesin (PFA), a polyphenylene sulfide resin (PPS) or an aliphatic polyamide.

The gasket 50 has a cylindrical portion 51 and a base 52. The cylindrical portion 51 is a site for preventing direct contact between the lid body 24 and the pillar portion 42s of the negative electrode terminal 40. The cylindrical portion 51 has a hollow tubular shape. The cylindrical portion 51 has a through-hole 51h running through in the vertical direction Z. The through-hole 51h is formed so as to allow insertion of the pillar portion 42s of the negative electrode terminal 40 prior to a crimping process. The cylindrical portion 51 is inserted into the terminal lead-out hole 24h of the lid body 24. The base 52 is a portion for preventing direct contact between the lid body 24 and a below-described flange portion 42f of the negative electrode terminal 40. The base 52 is connected to the upper end of the cylindrical portion 51. The base 52 extends in the horizontal direction from the upper end of the cylindrical portion 51. The base 52 is for instance formed to an annular shape, so as to surround the terminal lead-out hole 24h of the lid body 24. The base 52 extends along the top face of the lid body 24. The base 52 is clamped between a lower face 42d of the flange portion 42f of the negative electrode terminal 40 and the top face of the lid body 24, and becomes compressed in the vertical direction Z as a result of a crimping process.

The insulator 60 is an insulating member disposed between the lower face (inward face) of the lid body 24 and the negative electrode lead member 14. The insulator 60 has the function of insulating the lid body 24 and the negative electrode lead member 14 from each other. The insulator 60 has a flat plate-shaped portion spreading horizontally along the inward surface of the lid body 24. A through-hole 60h is formed in the flat plate-shaped portion, at a position corresponding to the terminal lead-out hole 24h. The through-hole 60h has an inner diameter of a size that allows inserting the pillar portion 42s of the negative electrode terminal 40. The insulator 60 is made up of a resin material that has resistance towards the electrolyte that is used, has electrical insulating properties, and is capable of deforming elastically; this resin material is for instance a fluororesin such as a perfluoroalkoxy fluororesin (PFA), a polyphenylene sulfide resin (PPS), or an aliphatic polyamide. The flat plate-shaped portion of the insulator 60 is clamped between the lower face of the lid body 24 and the top face of the negative electrode lead member 14, and becomes compressed in the vertical direction Z as a result of a crimping process.

Negative Electrode Terminal 40

The negative electrode terminal 40 is inserted into the terminal lead-out hole 24h and extends from the interior of the battery case 20 towards the exterior. As described below, the negative electrode terminal 40 is configured through integration of two types of conductive members, i.e. a first conductive member 41 and a second conductive member 42, by way of a fastening portion 43 and a metal joint 45. As illustrated in FIG. 3, the negative electrode terminal 40 is crimped, as a result of a crimping process, onto a peripheral edge portion that surrounds the terminal lead-out hole 24h of the lid body 24 in a state where the lid body 24 is insulated. A tack portion 40c becomes formed at a lower end of the negative electrode terminal 40. The negative electrode terminal 40 is fixed, through a crimping process, to the to the lid body 24, to be electrically connected to the negative electrode lead member 14.

Figure 4:
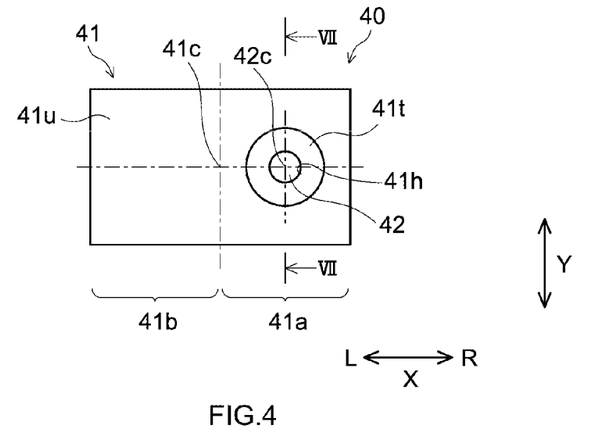
FIG. 4 is a plan-view diagram illustrating schematically a negative electrode terminal according to an embodiment.
Figure 5:
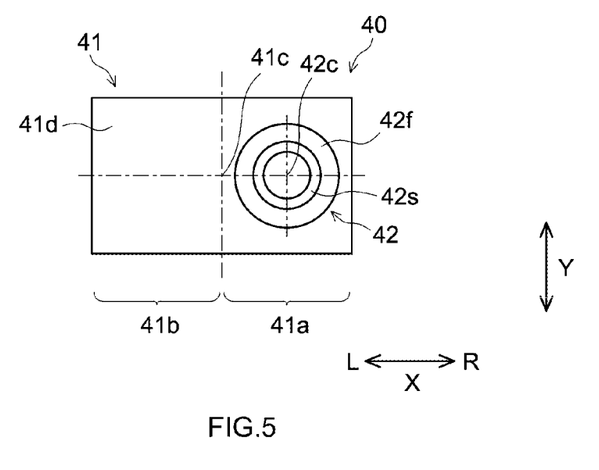
FIG. 5 is a bottom-view diagram illustrating schematically a negative electrode terminal according to an embodiment.
Figure 6:
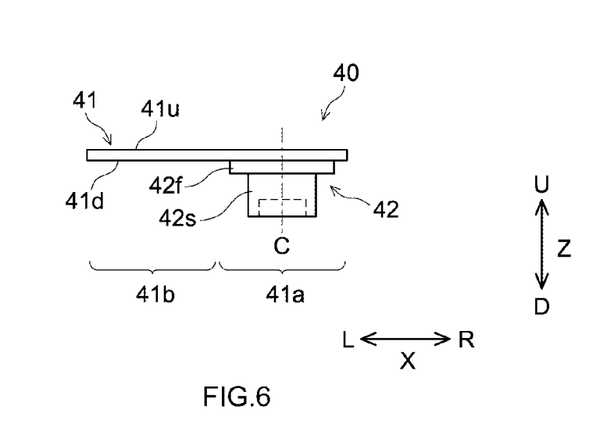
FIG. 6 is a side-view diagram illustrating schematically a negative electrode terminal according to an embodiment.
Figure 7:
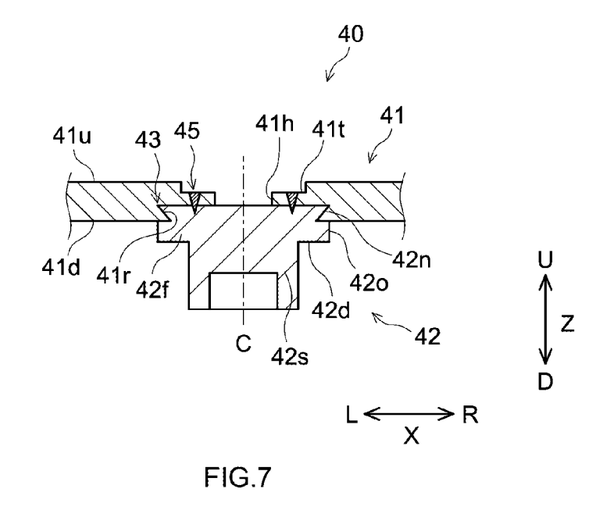
FIG. 7 is a schematic longitudinal cross-sectional diagram along line VII-VII in FIG. 4.

FIG. 4 to FIG. 6 are schematic diagrams of the negative electrode terminal 40 prior to attachment to the lid body 24 (i.e. prior to a crimping process). FIG. 4 is a plan-view diagram, FIG. 5 is a bottom-view diagram and a FIG. 6 is a side-view diagram. FIG. 7 is a schematic longitudinal cross-sectional diagram along line VII-VII in FIG. 4, illustrating schematically a key portion of the negative electrode terminal 40. As illustrated in FIG. 7, the negative electrode terminal 40 has the first conductive member 41, the second conductive member 42, the fastening portion 43 and the metal joint 45. The first conductive member 41 and the second conductive member 42 are integrated via the fastening portion 43 and the metal joint 45, to be electrically connected to each other.

The first conductive member 41 is a member disposed outside the battery case 20. The first conductive member 41 is made of a metal. The first conductive member 41 is for instance made up of a conductive metal such as aluminum, an aluminum alloy, nickel or stainless steel. The first conductive member 41 is herein made of aluminum. The first conductive member 41 may be of the same metal as that of the positive electrode lead member 13, or may be an alloy in which a same metal element constitutes a first component (i.e. the component of highest compounding ratio; likewise hereafter). The first conductive member 41 is plate-shaped, as illustrated in FIG. 4 to FIG. 6. The first conductive member 41 is herein flat plate-shaped. The first conductive member 41 has a lower face 41d and a top face 41u. The lower face 41d is the face on the side opposing the battery case 20 (specifically the lid body 24). The top face 41u is the face on the side facing away from battery case 20. In the art disclosed herein, the lower face is an example of the "one face" and the top face is an example of the "other face". The first conductive member 41 is herein of substantially rectangular shape. The first conductive member 41 has two portions demarcated in the long side direction X, namely a connection portion 41a electrically connected to the second conductive member 42 and an extension portion 41b extending towards one side (leftward in FIG. 4 to FIG. 6) from the connection portion 41a, in the long side direction X.

As illustrated in FIG. 7, the connection portion 41a has a thin-wall portion 41t formed to be thinner than the extension portion 41b (see also FIG. 4), a through-hole 41h running through in the vertical direction Z, and a recess 41r sunk from the lower face 41d of the first conductive member 41. The metal joint 45 is provided in the thin-wall portion 41t. As illustrated in FIG. 4, the thin-wall portion 41t is folioed to a ring-like (for instance annular) shape in a plan view. The through-hole 41h is formed to a ring-like (for instance annular) shape in a plan view. The second conductive member 42 (specifically a below-described flange portion 42f) is exposed from the through-hole 41h, at the top face 41u of the first conductive member 41. As illustrated in FIG. 7, the through-hole 41h is provided at a central portion of the thin-wall portion 41t. The through-hole 41h is provided further on the inner peripheral side than the fastening portion 43 and the metal joint 45. The through-hole 41h can function as an escape route of gas and heat that are generated during welding. The recess 41r is provided further on the outer peripheral side than the metal joint 45. Although omitted in the figures, the recess 41r is formed to a ring-like (for instance annular) shape in a plan view. The recess 41r is formed to a tapered shape the diameter whereof decreases towards the lower face 41d of the first conductive member 41 (in other words, decreases with increasing proximity to the second conductive member 42). A below-described constriction portion 42n of the second conductive member 42 is inserted into the recess 41r.

The extension portion 41b is a site of attachment of a respective bus bar 90 (see FIG. 8), which is a conductive member, in a case where an assembled battery 200 (see FIG. 8) is produced for instance by electrically connecting multiple batteries 100 to each other. Thanks to the extension portion 41b, the grounding surface area with the bus bars 90 can be sufficiently ensured, and the conduction reliability of the resulting assembled battery 200 can be improved. By virtue of the extension portion 41b of the first conductive member 41, the center position 41c of the first conductive member 41 is offset to the right, in the long side direction X, relative to the center position 42c of the second conductive member 42 (i.e. the center position of the below-described flange portion 421), as illustrated in FIG. 4 and FIG. 5.

The second conductive member 42 is a member extending from the interior of the battery case 20 to the exterior. The second conductive member 42 is herein made of a metal. The second conductive member 42 is for instance made up of a metal such as copper, a copper alloy, nickel or stainless steel. For instance a first component of the material of the second conductive member 42 may be identical to or different from that of the first conductive member 41. Herein the second conductive member 42 is made up of a metal of higher hardness than that of the first conductive member 41. The second conductive member 42 is herein made of copper. The second conductive member 42 may be of the same metal as that of the negative electrode lead member 14, or an alloy having the same metal element as a first component. A metal-coated portion covered with a metal such as Ni may be provided on part or the entirety of the surface of the second conductive member 42. This allows increasing resistance towards electrolytes and enhancing corrosion resistance. The second conductive member 42 has an axis center C as illustrated in FIG. 6 and FIG. 7. The second conductive member 42 has a flange portion 42f electrically connected to the first conductive member 41, and a pillar portion 42s connected to the lower end of the flange portion 42f.

The flange portion 42f has a larger external shape than that of the pillar portion 42s. As illustrated in FIG. 3, the external shape of the flange portion 42f is larger than that of the terminal lead-out hole 24h of the lid body 24. The flange portion 42f is a portion protruding outside the battery case 20 through the terminal lead-out hole 24h of the lid body 24. As illustrated in FIG. 5 to FIG. 7, the external shape of the flange portion 42f is substantially that of a cylindrical column. As illustrated in FIG. 6 and FIG. 7, the axis center of the flange portion 42f matches the axis center C of the second conductive member 42. As illustrated in FIG. 7, the flange portion 42f has a lower face 42d, a side face (outer peripheral surface) 42o extending upward from the lower face 42d, and a constriction portion 42n at which part of the side face 42o is constricted.

The constriction portion 42n is provided continuously or intermittently in part of the side face 42o of the flange portion 42f. Although omitted in the figures, the constriction portion 42n is formed to a ring-like (for instance annular) shape in a plan view. A high-strength fastening portion 43 can be formed when the constriction portion 42n is shaped as a ring. The constriction portion 42n is formed axisymmetrically with respect to the axis center C of the flange portion 42f. The constriction portion 42n is formed to a reverse-tapered shape the diameter whereof increases towards the top face 41u (in other words, increases with increasing distance from the pillar portion 42s). The constriction portion 42n is inserted into the recess 41r of the first conductive member 41. The constriction portion 42n mates into the recess 41r of the first conductive member 41, to thereby fit with the recess 41r. In the art disclosed herein the constriction portion 42n is an example of a "portion accommodated in the recess".

As illustrated in FIG. 7, the pillar portion 42s extends downward from the lower end of the flange portion 42f. The pillar portion 42s is shaped herein as a cylinder, as illustrated in FIG. 5 to FIG. 7. The axis center of the pillar portion 42s matches the axis center C of the flange portion 42f. The lower end of the pillar portion 42s, i.e. the end of the pillar portion 42s on the reverse side from that on which the flange portion 42f is positioned, is hollow prior to the crimping process. As illustrated in FIG. 3, the pillar portion 42s is the site of insertion of the negative electrode terminal 40 into the terminal lead-out hole 24h of the lid body 24 at the time of attachment of the negative electrode terminal 40 to the lid body 24. The lower end of the pillar portion 42s is a portion that spreads out through, to thereby configure the tack portion 40c, when pushed as a result of the crimping process, at the time of attachment of the negative electrode terminal 40 to the lid body 24. The pillar portion 42s becomes electrically connected to the negative electrode lead member 14 in the interior of the battery case 20 as a result of the crimping process.

The fastening portion 43 is a linking portion at which there are mechanically fixed the first conductive member 41, and the flange portion 42f of the second conductive member 42. Herein the fastening portion 43 is provided further on the outer peripheral side of the flange portion 42f than the metal joint 45, in a plan view. The fastening portion 43 is formed to a ring-like (for instance annular) shape in a plan view. As a result it becomes possible to increase the strength of the fastening portion 43 and to further improve the conduction reliability of the negative electrode terminal 40. Herein the fastening portion 43 is formed continuously. However, this is not a limiting configuration, and the fastening portion 43 may be provided on the lower face 41d of the first conductive member 41. Specifically, a configuration may be adopted in which the inner wall of the recess 41r of the first conductive member 41 is fixed (for instance by pressing and fixing) by the constriction portion 42n of the second conductive member 42. The strength of the fastening portion 43 is increased as a result.

The method for forming the fastening portion 43 is not particularly limited, so long as it involves mechanical joining relying on mechanical energy, and may be for instance press-fitting, shrink-fitting, crimping, riveting, folding, bolt joining or the like. In several preferred embodiments the fastening portion 43 is a fitting portion at which the recess 41r of the first conductive member 41 and the constriction portion 42n of the second conductive member 42 are fitted with each other. As a result, for instance the first conductive member 41 and the second conductive member 42 can be suitably fixed even when the first conductive member 41 and the second conductive member 42 are made of dissimilar metals. The fastening portion 43 may be for instance a press-fit fitting portion in which the constriction portion 42n of the second conductive member 42 is fitted, through press-fitting, into the recess 41r of the first conductive member 41.

The metal joint 45 is a metallurgical joint of the first conductive member 41 and the flange portion 42f of the second conductive member 42. Herein the metal joint 45 is provided at the top face 41u of the first conductive member 41. The metal joint 45 is provided at a position spaced from the through-hole 41h. The metal joint 45 is provided further on the outer peripheral side than the through-hole 41h. The metal joint 45 is provided at a position spaced from the fastening portion 43. For instance the metal joint 45 may be a joint of relatively higher rigidity than that of the fastening portion 43.

The metal joint 45 is provided further on the inner peripheral side (center side) of the flange portion 42f than the fastening portion 43, in a plan view. The metal joint 45 is formed using for instance light energy, electron energy or thermal energy, and accordingly the metal joint 45 exhibits relatively lower strength (more brittleness) than the fastening portion 43. By arranging the metal joint 45 on the inner peripheral side of the fastening portion 43 it becomes possible to stably maintain the metal joint 45, and to increase the conduction reliability of the negative electrode terminal 40 over long periods of time. Herein the metal joint 45 is provided in the thin-wall portion 41t. As a result, little energy is consumed during joining, and weldability can be improved. The metal joint 45 is formed continuously or intermittently. The metal joint 45 is formed axisymmetrically with respect to the axis center C of the flange portion 42f. The metal joint 45 is formed to a ring-like (for instance annular) shape in a plan view. As a result it becomes possible to increase the strength of the metal joint 45 and to further increase the conduction reliability of the negative electrode terminal 40.

The method for forming the metal joint 45 is not particularly limited, and may be for instance fusion welding, pressure welding or brazing. In some preferred embodiments the metal joint 45 is a welded joint formed by welding such as laser welding, electron beam welding, ultrasonic bonding, resistance welding or TIG (Tungsten Inert Gas) welding. A high-strength metal joint 45 can be formed stably as a result. However, the metal joint 45 may be formed in accordance with a method other than welding, for instance thermocompression bonding, ultrasonic bonding or brazing.

As described above, the negative electrode terminal 40 has two types of linking portions involving different connecting methods, i.e. the fastening portion 43 and the metal joint 45. As a result, strain does not readily build in the negative electrode terminal 40, and a state of close contact between the first conductive member 41 and the second conductive member 42 can be readily maintained even when the negative electrode terminal 40 is acted upon by external vibration or shocks. That is, the first conductive member 41 and the second conductive member 42 are unlikely to separate from each other. As a result it becomes possible to stably maintain a conductive connection between the first conductive member 41 and the second conductive member 42, and to improve the conduction reliability of the negative electrode terminal 40.

Method for Producing the Negative Electrode Terminal 40

Although not particularly limited thereto, the negative electrode terminal 40 can be produced for instance in accordance with a production method that includes typically a fastening step of preparing a first conductive member 41 and a second conductive member 42 such as those described above, and a metal joining step, in that order. However, the order of the fastening step and of the metal joining step may be reversed, or the steps may be performed substantially simultaneously. The production method disclosed herein may further include other steps, at any stage.

In the fastening step the first conductive member 41 and the flange portion 42f of the second conductive member 42 are mechanically fixed to each other, to form the fastening portion 43. The fastening portion 43 can be formed for instance by inserting the constriction portion 42n of the second conductive member 42 into the recess 41r of the first conductive member 41, to deform the recess 41r of the first conductive member 41 along the external shape of the constriction portion 42n of the second conductive member 42 and thereby fix the inner wall of the recess 41r at the second conductive member 42. The strength of the fastening portion 43 is increased as a result. In several preferred embodiments the fastening portion 43 is formed through fitting of the recess 41r of the first conductive member 41 and the constriction portion 42n of the second conductive member 42. For instance, the fastening portion 43 can be formed through horizontal press-fitting of the constriction portion 42n of the second conductive member 42 into the recess 41r of the first conductive member 41. The workability of the fastening step can be increased as a result.

In the metal joining step the thin-wall portion 41t of the first conductive member 41 and the flange portion 42f of the second conductive member 42 are metal-joined, i.e. are joined metallurgically, to thereby form the metal joint 45. By performing the metal joining step after the fastening step it becomes possible to form a metal joint 45 of stable shape with good precision. The metal joint 45 can be formed, by welding, so as to run through the thin-wall portion 41t, at the site at which the thin-wall portion 41t of the first conductive member 41 and the flange portion 42f of the second conductive member 42 lay on each other. Gas and heat generated during welding are vented/diffused out of the through-hole 41h. Accumulation of gas or heat between the thin-wall portion 41t and the flange portion 42f can be thus be suppressed by means of the through-hole 41h. A high-strength metal joint 45 can be formed stably through welding.

In some preferred embodiments the metal joint 45 is formed further on the inner peripheral side than the fastening portion 43. As a result, joint points are less likely to shift, and workability in the metal joining step can be improved. Further, welds are less prone to wobble in a case where the metal joint 45 is formed through welding, and weldability can be improved. In a case where the thin-wall portion 41t is welded, less energy is required, and thus weldability can be improved.

Method for Producing the Battery 100

The battery 100 is characterized by using a positive electrode terminal 30 and/or negative electrode terminal 40 produced in accordance with a production method such as the one above. Otherwise, the production process is similar to conventional ones. The battery 100 can be produced in accordance with a production method that involves preparing an electrode body 10, an electrolyte, a case body 22, a lid body 24, a positive electrode terminal 30 and a negative electrode terminal 40 such as those described above, the method including a mounting step and a joining step.

In the mounting step the positive electrode terminal 30, the positive electrode lead member 13, the negative electrode terminal 40 and the negative electrode lead member 14 are attached to the lid body 24. The negative electrode terminal 40 and the negative electrode lead member 14 are fixed to the lid body 24 as a result of a crimping process (riveting), for instance as illustrated in FIG. 3. The crimping process is performed by clamping the gasket 50 between the negative electrode terminal 40 and the lid body 24, and clamping the insulator 60 between the lid body 24 and the negative electrode lead member 14. Specifically, the pillar portion 42s prior to the crimping process of the negative electrode terminal 40 is caused to sequentially pass, from above the lid body 24, through the cylindrical portion 51 of the gasket 50, the terminal lead-out hole 24h of the lid body 24, the through-hole 60h of the insulator 60, and the through-hole 14h of the negative electrode lead member 14, so as to protrude under the lid body 24. The pillar portion 42s protruding under the lid body 24 is then crimped so that a compression force is exerted in the vertical direction Z. The tack portion 40c becomes formed as a result at the tip end (lower end in FIG. 3) of the pillar portion 42s of the negative electrode terminal 40.

As a result of such a crimping process, the base 52 of the gasket 50 and a flat plate-shaped portion of the insulator 60 are compressed, the gasket 50, the lid body 24, the insulator 60 and the negative electrode lead member 14 are fixed integrally to the lid body 24, and the terminal lead-out hole 24h becomes sealed. The mounting method of the positive electrode terminal 30 and the positive electrode lead member 13 may be similar to that of the negative electrode terminal 40 and the negative electrode lead member 14. The negative electrode lead member 14 is welded to the negative electrode collector exposed portion of the negative electrode collector 12, whereupon the negative electrode of the electrode body 10 and the negative electrode terminal 40 become electrically connected to each other. Similarly, the positive electrode lead member 13 is welded to the positive electrode collector exposed portion of the positive electrode collector 11 whereupon the positive electrode of the electrode body 10 and the positive electrode terminal 30 become electrically connected to each other. The lid body 24, the positive electrode terminal 30, the negative electrode terminal 40 and the electrode body 10 become integrated with each other as a result.

In the joining step, the electrode body 10 integrated with the lid body 24 is accommodated in the interior space of the case body 22, and the case body 22 and the lid body 24 are sealed. Sealing can be accomplished for instance by welding such as laser welding. Thereafter, a nonaqueous electrolyte solution is injected through a filling port, not shown, and the filling port is plugged, to thereby seal the battery 100. The battery 100 can be produced thus in the above-described manner.

Figure 8:
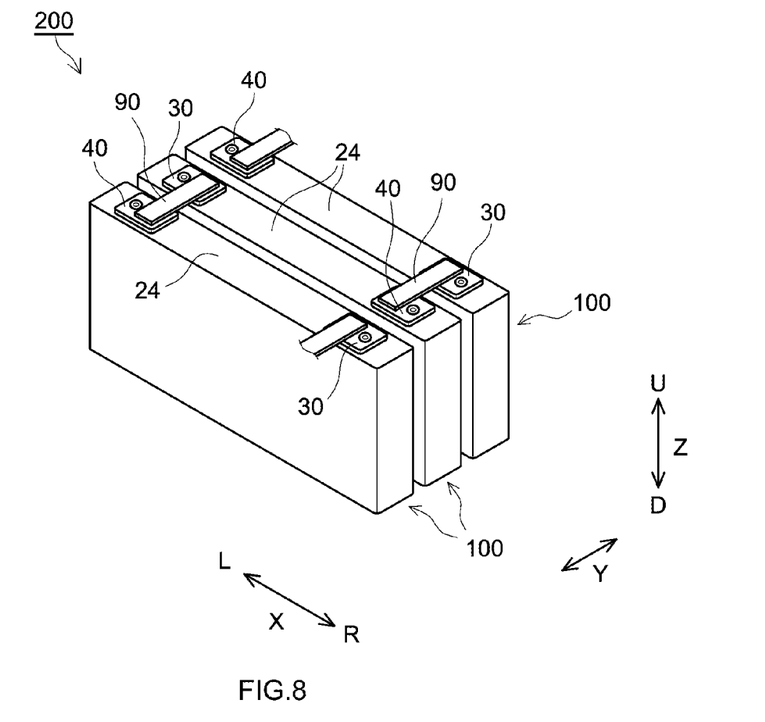
FIG. 8 is a perspective-view diagram illustrating schematically an assembled battery according to an embodiment.

The battery 100 can be used in various applications, but can be suitably utilized in applications where the battery is acted upon by external forces such as vibration and shocks while in use; for instance, the battery can typically be used as a power source (drive power source) for motors, when mounted in a vehicle such as a passenger car or a truck. The type of vehicle is not particularly limited, and examples thereof include plug-in hybrid vehicles (PHVs), hybrid vehicles (HVs) and electric vehicles (EVs). As illustrated in FIG. 8, the battery 100 can suitably be used also in the form of an assembled battery 200 resulting from electrically connecting a plurality of batteries 100 to each other via the bus bars 90. In this case, the batteries 100 can be electrically connected to each other for instance by spanning flat plate-shaped bus bars 90 across the extension portions 41b of respective first conductive members 41. The bus bars 90 are for instance made up of a conductive metal such as aluminum, an aluminum alloy, nickel or stainless steel. The bus bars 90 and the extension portions 41b can be electrically connected to each other for instance by welding such as laser welding.

Several embodiments of the present disclosure have been explained above, but these embodiments are merely illustrative. The present disclosure can be realized in accordance with various other implementations. The disclosure can be carried out on the basis of the description of the present specification and common technical knowledge in the relevant technical field. The technical features set forth in the claims encompass various modifications and alterations of the embodiments illustrated above. For instance, parts of the above-described embodiments can be replaced with other modifications, or alternatively other modifications may be added to the above-described embodiments. The technical features of these modifications, unless explained as essential, may be omitted as appropriate.

For instance, in the above embodiments the fastening portion 43 is a fitting portion (for example a press-fit fitting portion). However, the fastening portion 43 is not limited thereto. The fastening portion 43 may be for instance a crimp portion.

Figure 9:
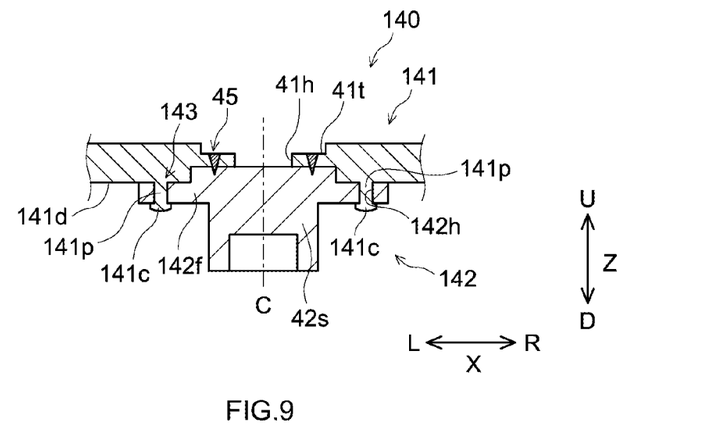
FIG. 9 is a longitudinal cross-sectional diagram illustrating schematically a key portion of a negative electrode terminal according to a variation.

FIG. 9 is a longitudinal cross-sectional diagram illustrating schematically a key portion of a negative electrode terminal 140 according to a first variation. The negative electrode terminal 140 may be similar to the above-described negative electrode terminal 40, except for being provided herein with a first conductive member 141, a second conductive member 142 and a fastening portion 143. The first conductive member 141 may be similar to the first conductive member 41 described above, except for not having the recess 41r but having, instead, a plurality of leg portions 141p. The leg portions 141p are formed to protrude downward from a lower face 141d (on the same side as that of the pillar portion 42s) and to be capable of running through through-holes 142h of the second conductive member 142, in a state prior to a crimping process. The leg portions 141p are formed axisymmetrically with respect to an axis center C of a below-described flange portion 142f. The number of leg portions 141p is for instance six. The second conductive member 142 is similar to the second conductive member 42, except for being provided with a flange portion 142f having respective through-holes 142h at positions corresponding to the plurality of leg portions 141p, instead of being provided with the constriction portion 42n. The plurality of leg portions 141p run through respective corresponding through-holes 142h. The tips of the leg portions 141p (lower end in FIG. 9) undergo a crimping process. Crimp portions 141c become formed at the peripheral edge portion of the through-holes 142h of the second conductive member 142. The fastening portion 143 is herein the crimp portions 141c. The crimp portions 141c are formed to an intermittent ring-like (for instance annular) shape in a plan view with respect to the axis center C of the flange portion 142f. As a result this allows increasing the strength of the fastening portion 143, and to enhance workability at the time of formation of the fastening portion 143.

In the above-described embodiment, for instance the constriction portion 42n of the second conductive member 42 is provided at part of the side face 42o of the flange portion 42f. However, the constriction portion 42n is not limited thereto. For instance, the constriction portion 42n may be provided over the entire side face 42o of the flange portion 42f.

Figure 10:
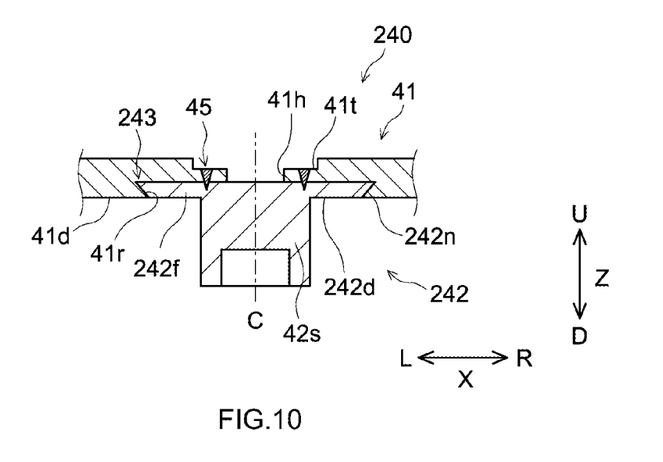
FIG. 10 is a longitudinal cross-sectional diagram illustrating schematically a key portion of a negative electrode terminal according to a variation.

FIG. 10 is a longitudinal cross-sectional diagram illustrating schematically a key portion of a negative electrode terminal 240 according to a second variation. The negative electrode terminal 240 may be similar to the above-described negative electrode terminal 40, except for being provided with a second conductive member 242, and a fastening portion 243. The second conductive member 242 may be similar to the above-described second conductive member 42, except for being provided with a flange portion 242f having a constriction portion 242n, instead of the constriction portion 42n. The constriction portion 242n is provided over the entire side face of the flange portion 242f. The fastening portion 243 is configured through pressing and fixing of the inner wall of the recess 41r of the first conductive member 41 at the constriction portion 242n of the second conductive member 242. The lower face 41d of the first conductive member 41 and a lower face 242d of the flange portion 242f of the second conductive member 242 are formed flush with each other. As a result the negative electrode terminal 240 can be made more compact in the vertical direction Z.

In the above-described embodiment, for instance the first conductive member 41 has the thin-wall portion 41t, and the metal joint 45 is formed on the thin-wall portion 41t. The metal joint 45 is provided at a position spaced from the through-hole 41h. However, the metal joint 45 is not limited thereto. For instance the metal joint 45 may be formed other than at the thin-wall portion 41t, and may be for instance formed along the outer edge of the through-hole 41h.

Figure 11:
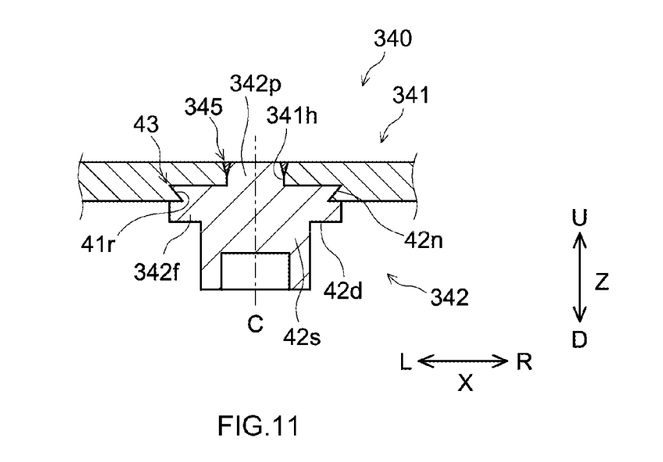
FIG. 11 is a longitudinal cross-sectional diagram illustrating schematically a key portion of a negative electrode terminal according to a variation.

FIG. 11 is a longitudinal cross-sectional diagram illustrating schematically a key portion of a negative electrode terminal 340 according to a third variation. A negative electrode terminal 340 may be similar to the negative electrode terminal 40 described above, except for being provided with a first conductive member 341, a second conductive member 342 and a metal joint 345. The first conductive member 341 may be similar to the first conductive member 41 described above, except for not having the thin-wall portion 41t, and having a through-hole 341h instead of the through-hole 41h. The through-hole 341h has a greater length, in the vertical direction Z, than that of the through-hole 41h. The second conductive member 342 may be similar to the above-described second conductive member 42, other than by being provided with a flange portion 342f having a protrusion 342p. The protrusion 342p is formed to protrude upward (on the reverse side from that of the pillar portion 42s) from the top face of the flange portion 342f, so as to being insertable into the through-hole 341h of the first conductive member 341. The protrusion 342p is inserted into the through-hole 341h. The metal joint 345 is formed through continuous or intermittent metal joining of the first conductive member 341 and the protrusion 342p of the second conductive member 342, along the outer edge of the through-hole 341h. The close-contact state of the first conductive member and the second conductive member can be maintained yet better as a result. Moreover, the first conductive member 341 can have a simple shape, and the manufacturing cost of the first conductive member 341 can be reduced.

In the above-described embodiment, for instance the pillar portion 42s of the negative electrode terminal 40 is crimped by being deformed, so that the negative electrode lead member 14 and the negative electrode terminal 40 become electrically connected as a result. However, the connection method is not limited thereto. The method for electrically connecting the negative electrode lead member 14 and the negative electrode terminal 40 may involve for instance mechanical fixing other than by a crimping process, and may involve metal joining typified welding, or a combination of the foregoing. From the viewpoint of increasing the reliability of the connection portion, a fastening portion at which the negative electrode lead member 14 and the negative electrode terminal 40 are mechanically fixed, and a metal joint for continuous or intermittent metal joining of the peripheral edge of the fastening portion, may be formed at the connection portion of the negative electrode lead member 14 and the negative electrode terminal 40.

What is claimed is:

1. A terminal, comprising:
a first conductive member;
a second conductive member having a flange portion electrically connected to the first conductive member;
a fastening portion at which there are mechanically fixed the first conductive member and the flange portion of the second conductive member; and
a metal joint at which the first conductive member and the flange portion of the second conductive member are metal-joined, at a position spaced from the fastening portion,
wherein
the flange portion of the second conductive member includes a constriction portion formed to include an annular notch having a tapered shape with a changing diameter along a portion of a radially outer circumferential side face of the flange portion axisymmetrically with respect to a central axis of the second conductive member;
the fastening portion is a fitting portion at which the constriction portion of the flange portion of the second conductive member and the first conductive member are fitted with each other; and
the flange portion of the second conductive member further includes a shoulder portion seated against a lower face of the first conductive member below the constriction portion.

2. The terminal according to claim 1, wherein
the first conductive member has a recess that accommodates at least part of the constriction portion of the flange portion of the second conductive member; and
the fastening portion is configured through fixing of an inner wall of the recess of the first conductive member by the constriction portion of the flange portion of the second conductive member accommodated in the recess.

3. The terminal according to claim 1, wherein
the flange portion of the second conductive member has a through-hole;
the first conductive member has a leg portion inserted into the through-hole; and
the fastening portion is configured through insertion of that the leg portion of the first conductive member into the through-hole of the second conductive member.

4. The terminal according to claim 3, wherein the fastening portion is a crimp portion in which a tip of the leg portion is crimped onto a peripheral edge portion of the through-hole.

5. The terminal according to claim 1, wherein the metal joint is a welded joint.

6. A terminal, comprising:
a first conductive member;
a second conductive member having a flange portion electrically connected to the first conductive member, wherein the flange portion includes a constriction portion formed to include an annular notch having a tapered shape with a changing diameter along a portion of a radially outer circumferential side face of the flange portion axisymmetrically with respect to a central axis of the second conductive member, and wherein the flange portion of the second conductive member further includes a shoulder portion seated against a lower face of the first conductive member below the constriction portion;
a fastening portion at which there are mechanically fixed the first conductive member and the flange portion of the second conductive member; and
a metal joint at which the first conductive member and the flange portion of the second conductive member are metal-joined, at a position spaced from the fastening portion, wherein a radial distance between the metal joint and a central axis of the second conductive member is smaller than a radial distance between the fastening portion and the central axis of the second conductive member, in a plan view looking in a direction parallel to the central axis of the second conductive member.

7. The terminal according to claim 1, wherein
the first conductive member has a substantially rectangular shape; and
a position of a center of the first conductive member and a position of a center of the flange portion of the second conductive member are offset from each other, in a long side direction of the first conductive member.

8. The terminal according to claim 1, wherein
the fastening portion is provided on a lower face of the first conductive member; and
the metal joint is provided on a top face of the first conductive member.

9. A secondary battery, comprising the terminal according to claim 1.

10. A method for producing a terminal, the method comprising:
a fastening step of mechanically fixing a plate-shaped first conductive member and a flange portion of a second conductive member, to form a fastening portion that electrically connects the first conductive member and the second conductive member; and
a metal joining step of, after the fastening step, forming a metal joint through metal-joining of the first conductive member and the flange portion of the second conductive member, at a position spaced from the fastening portion, wherein
the flange portion of the second conductive member includes a constriction portion formed to include an annular notch having a tapered shape with a changing diameter along a portion of a radially outer circumferential side face of the flange portion axisymmetrically with respect to a central axis of the second conductive member; and
in the fastening step, the fastening portion is formed through fitting of the first conductive member to the constriction portion of the second conductive member, and seating of a shoulder portion of the flange portion of the second conductive member against a lower face of the first conductive member below the constriction portion.

11. The method for producing a terminal according to claim 10, wherein
the first conductive member has a recess that accommodates at least part of the flange portion of the second conductive member; and
in the fastening step, part of the second conductive member is inserted into the recess, and the recess of the first conductive member is deformed along an external shape of the second conductive member, to fix as a result an inner wall of the recess by the second conductive member, and thereby form the fastening portion.

12. The method for producing a terminal according to claim 10, wherein in the metal joining step a welded joint is formed through welding of the first conductive member and the flange portion of the second conductive member.

13. The method for producing a terminal according to claim 10, wherein a radial distance between the metal joint and a central axis of the second conductive member is smaller than a radial distance between the fastening portion and the central axis of the second conductive member, in a plan view looking in a direction parallel to the central axis of the second conductive member.

14. The terminal according to claim 1, wherein the constriction portion of the flange portion of the second conductive member is formed in an annular shape that tapers from a smaller diameter toward a lower face of the flange portion to a larger diameter toward a top face of the flange portion.

15. The terminal according to claim 2, wherein the constriction portion of the flange portion of the second conductive member is press-fit and fixed to the inner wall of the recess of the first conductive member.

16. The terminal according to claim 2, wherein the first conductive member has a through-hole running through the recess in a vertical direction Z.

17. The method for producing a terminal according to claim 10, wherein an inner wall of a recess of the first conductive member is fixed by the constriction portion of the second conductive member.

18. A method for producing a secondary battery, wherein there is used a terminal produced in accordance with the method for producing a terminal according to claim 10.

19. The terminal according to claim 1, wherein the first conductive member is plate-shaped.

20. The terminal according to claim 6, wherein the first conductive member is plate-shaped.

* * * * *